United States Patent [19]

Huang

[11] Patent Number: 5,482,311
[45] Date of Patent: Jan. 9, 1996

[54] ADJUSTING/POSITIONING DEVICE FOR A BACKREST OF A STROLLER

[76] Inventor: Li-Chu C. Huang, No. 9, Alley 2, Lane 606, Sec. 2, Po Ai Rd., Chia Yi City, Taiwan

[21] Appl. No.: 300,407

[22] Filed: Sep. 2, 1994

[51] Int. Cl.⁶ ...................................................... B62B 7/08
[52] U.S. Cl. ........................... 280/642; 280/650; 280/658; 297/354.13
[58] Field of Search ..................................... 280/642, 643, 280/648, 650, 658, 47.38; 297/354.13, 354.12

[56] References Cited

U.S. PATENT DOCUMENTS

| | | | |
|---|---|---|---|
| 3,110,504 | 11/1963 | Myers | 280/47.4 |
| 3,184,249 | 5/1965 | Shone | 280/650 |
| 3,784,252 | 1/1974 | Peterson | 297/354.13 |
| 4,632,421 | 12/1986 | Shamie | 280/658 |

FOREIGN PATENT DOCUMENTS 2603240  3/1988  France ................................ 280/642

*Primary Examiner*—Karin L. Tyson
*Attorney, Agent, or Firm*—Ross, Clapp, Korn & Montgomery

[57] ABSTRACT

A backrest adjusting device for a stroller includes a slidable seat slidably mounted to each of two limbs of a backrest frame member of the stroller. Each slidable seat includes a receptacle, a spring mounted in the receptacle, a first pin mounted above the spring and transversely passing through an associated limb of the backrest frame member, a stop piece mounted in the receptacle and located above the first pin thereby defining a lowermost position of the slidable seat, and a second pin projecting outward from an outer periphery thereof. A pull bar is mounted between the slidable seats. The second pins engage with sockets defined in a frame of the stroller when the backrest frame member is in a substantially upright position. The backrest frame member is pivotable to a substantially horizontal position when the second pins disengage with the sockets upon actuation of the pull bar which causes upward movement of the slidable seats.

4 Claims, 4 Drawing Sheets

5,482,311

ADJUSTING/POSITIONING DEVICE FOR A BACKREST OF A STROLLER

BACKGROUND OF THE INVENTION

1. Field of the Invention

The present invention relates to a stroller and, more particularly, to a stroller with an improved adjusting/positioning device for a backrest thereof.

2. Description of Related Art

A variety of devices have heretofore been provided to strollers to improve utility thereof, such as devices for controlling rotational direction of wheels, detachable and adjustable armrests, devices for changing orientation of handles, devices for adjusting inclination angle of the backrest, and devices allowing folding of the stroller.

A typical adjustable backrest of a stroller includes a pull bar mounted to a rear side of the backrest and a cross bar which is mounted to a bottom of the pull bar and which has an end mounted in a positioning plate, which, in turn, mounted to a side of a frame of the stroller. The positioning plate includes a plurality of engaging grooves. A spring is mounted to each of two sides of the pull bar to retain the latter in position. If adjustment of inclination angle of the backrest is required, the pull bar is lifted upward, allowing the backrest to be pivoted to a desired inclination angle.

However, the above-mentioned structure still has several drawbacks. Firstly, the pull bar, the positioning plate, and the springs are exposed outside such that the fingers of the operator may be clamped and thus injured. Furthermore, children also risk being injured if the fingers thereof are placed in the engaging grooves and the pull bar is inadvertently actuated. Moreover, the above-mentioned elements tend to rust when made of metal as they are externally exposed. Taking the springs as an example, if the springs rust, the elasticity thereof is adversely affected, and sometimes the springs may even separate from the stroller such that the backrest no longer can be adjusted as the pull bar cannot be positioned. A further drawback of the above-mentioned structure is that the user has to operate with both hands.

Therefore, there has been a long and unfulfilled need for a stroller with an improved arrangement for adjusting/positioning the backrest.

SUMMARY OF THE INVENTION

It is accordingly a primary object of the present invention to provide a backrest adjusting device for a stroller which includes a slidable seat slidably mounted to each of two limbs of a backrest frame member of the stroller. Each slidable seat includes a receptacle, a spring mounted in the receptacle, a first pin mounted above the spring and transversely passing through an associated limb of the backrest frame member, a stop piece mounted in the receptacle and located above the first pin thereby defining a lowermost position of the slidable seat, and a second pin projecting outward from an outer periphery thereof. A pull bar is mounted between the slidable seats. The second pins engage with sockets defined in a frame of the stroller when the backrest frame member is in a substantially upright position. The backrest frame member is pivotable to a substantially horizontal position when the second pins disengage with the sockets upon actuation of the pull bar which causes upward movement of the slidable seats.

In accordance with one aspect of the invention, each slidable seat includes a first section having a longitudinal bore defined therein through which an associated limb of the backrest frame member passes, a second section having a receptacle therein which communicates with the longitudinal bore and which receives the spring and the stop piece, a pin head receiving compartment defined in the first section opposite to the second section for receiving a pin head of the first pin, and a recess defined in the second section opposite to the pin head receiving compartment for receiving a distal end of a stem of the first pin.

Other objects, advantages, and novel features of the invention will become more apparent from the following detailed description when taken in conjunction with the accompanying drawings.

DESCRIPTION OF THE PREFERRED EMBODIMENT

Figure 1:
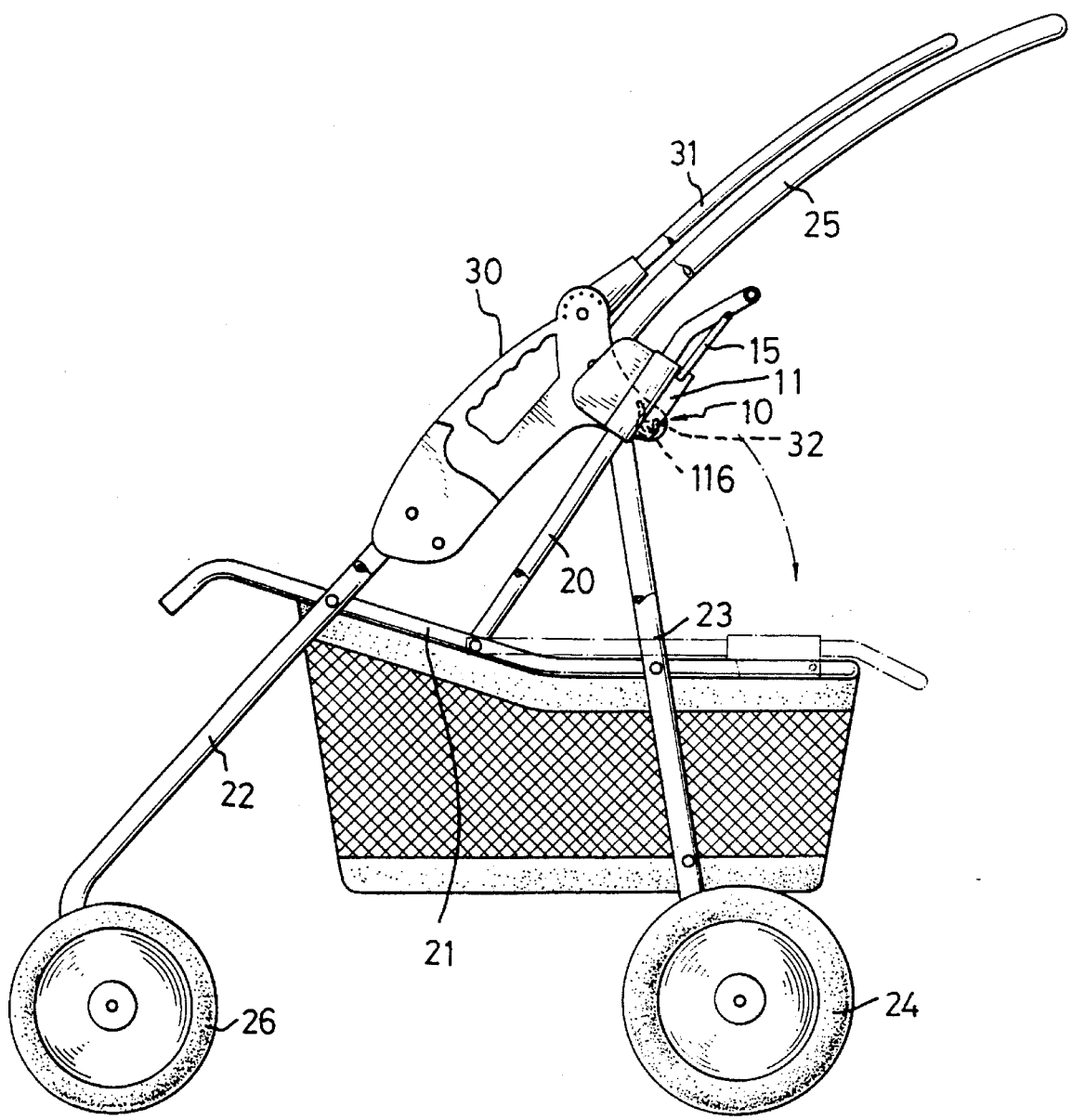
FIG. 1 is a schematic side elevational view of a stroller with a backrest adjusting/positioning device in accordance with the present invention.

Referring to the drawings and initially to FIG. 1, a stroller generally includes a pair of front members 22 each having a lower end to which a front wheel 26 is mounted, a pair of rear members 23 each having a lower end to which a rear wheel 24 is mounted, a substantially U-shaped seat frame member 21 pivoted to the front and rear members 22 and 23. The upper ends of the front and associated rear members 22 and 23 are connected together by a foldable seat 30. A handle 25 is mounted to the foldable seat 30, and a canopy supporting member 31 is pivotally connected to the foldable seat 30. A substantially U-shaped backrest frame member 20 has two distal lower ends thereof respectively mounted to two limbs of the U-shaped seat frame member 21.

Figure 2:
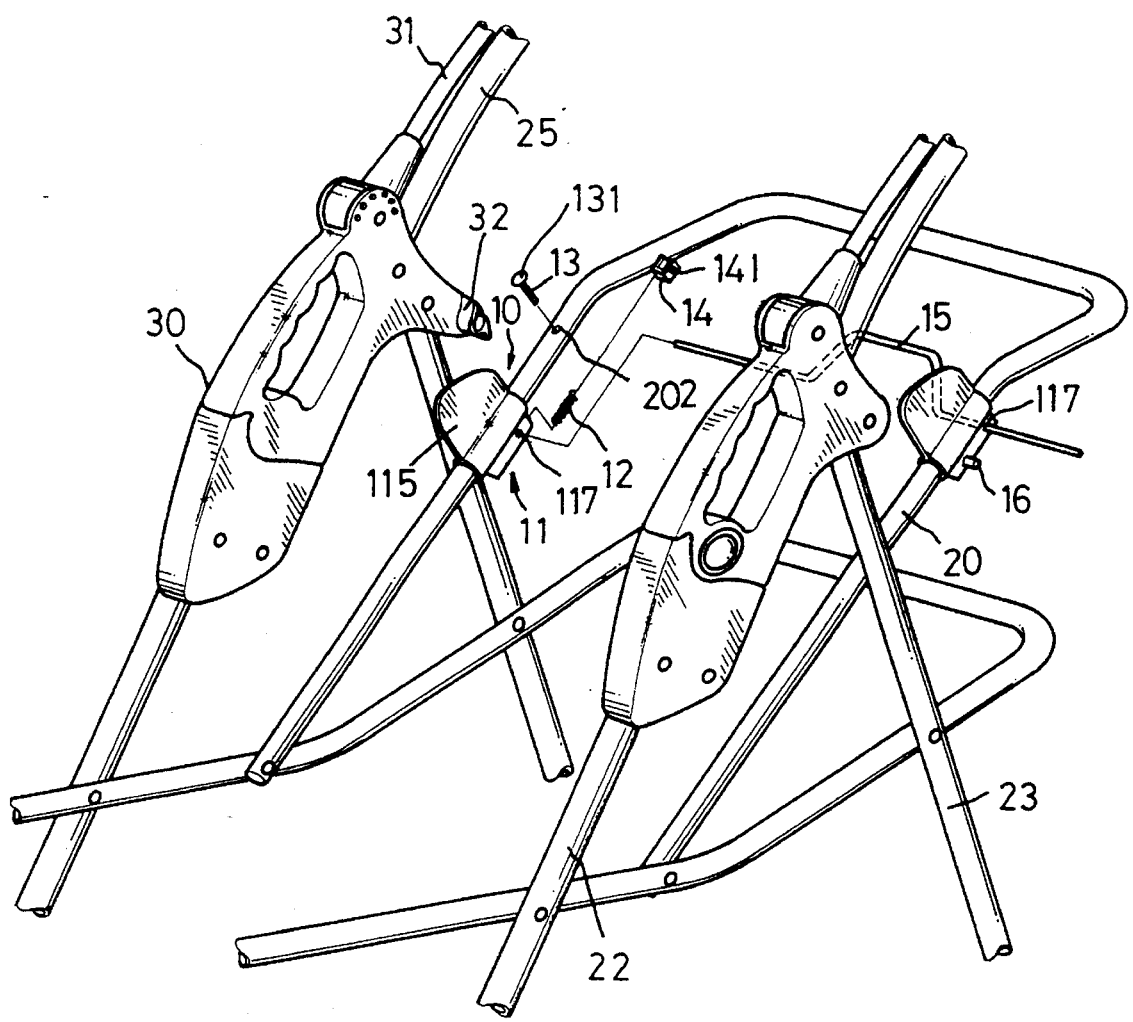
FIG. 2 is an exploded view of the backrest adjusting/positioning device in accordance with the present invention.
Figure 5:
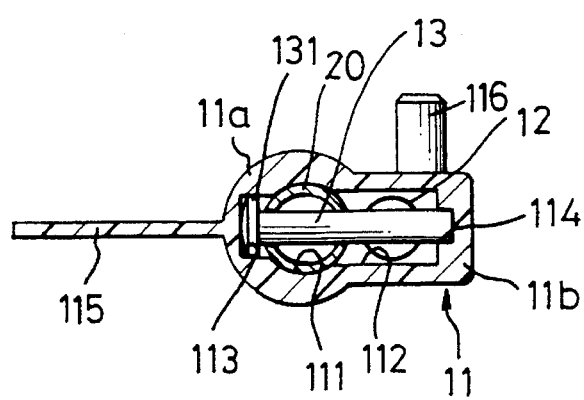
FIG. 5 is a cross-sectional view taken along line 5—5 in FIG. 3.

The invention features that a slidable seat 11 is mounted to each of two limbs of the U-shaped backrest frame member 20. Still referring to FIG. 1 and further to FIG. 5, the slidable seat 11 includes a substantially circular first section 11a in which a longitudinal bore 111 is defined such that the limb of the U-shaped backrest frame member 20 may pass, a substantially U-shaped second section 11b in which a receptacle 112 which communicates with the longitudinal bore 111 is defined, and a wing 115 extending from an outer periphery of the first section 11a. A pin head receiving compartment 113 is defined in the first section 11a opposite to the second section 11b. A recess 114 is defined in the second section 11b which is opposite to the pin head receiving compartment 113. A positioning pin 116 projects from the periphery of the slidable seat 11. Furthermore, a hole 117 (see FIG. 2) is defined in the second section 11b and extends in a horizontal direction which is perpendicular to the longitudinal direction of the stroller.

Referring to FIGS. 1, 2, 3, and 5, before the backrest frame member 20 is pivoted to the seat frame member 21, each slidable seat 11 is mounted to the associated limb of the backrest frame member 20 which passes through the bore 111. Then, a return spring 12 is positioned in the receptacle 112. Thereafter, a pin 13 is riveted through a hole 202 (see FIGS. 2 and 3) defined in the backrest frame member 20 with a pin head 131 located in the pin head receiving compartment 113 and with the distal end of a stem of the pin 13 received in the recess 114 in the second section 11b of the slidable seat 11. It is appreciated that the pin 131 is above the return spring 12.

A stop piece 14 is also positioned in the receptacle 112 of each slidable seat 11 and rests on the pin 131. The stop piece 14 includes a bore 141 which aligns with the hole 117 defined in the second section 11b of the slidable seat 11. A substantially L-shaped or Ω shaped pull bar 15 has two ends which respectively pass through associated bore 141 and hole 117 and which are then riveted in position, thereby accomplishing the assembly of the backrest adjusting/positioning device.

Figure 3:
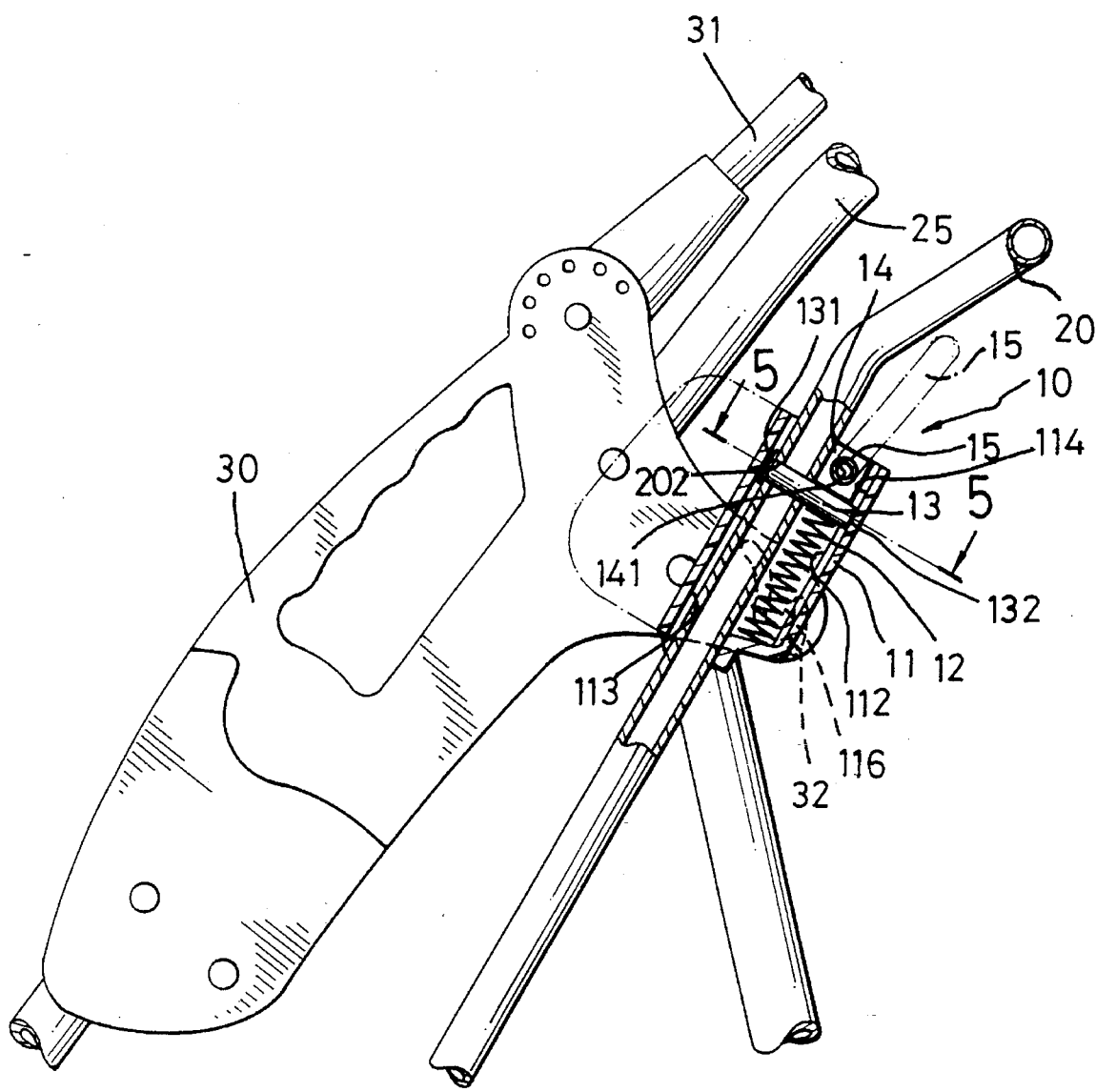
FIG. 3 is a partial perspective view, partly in section, of the backrest adjusting/positioning device.
Figure 4:
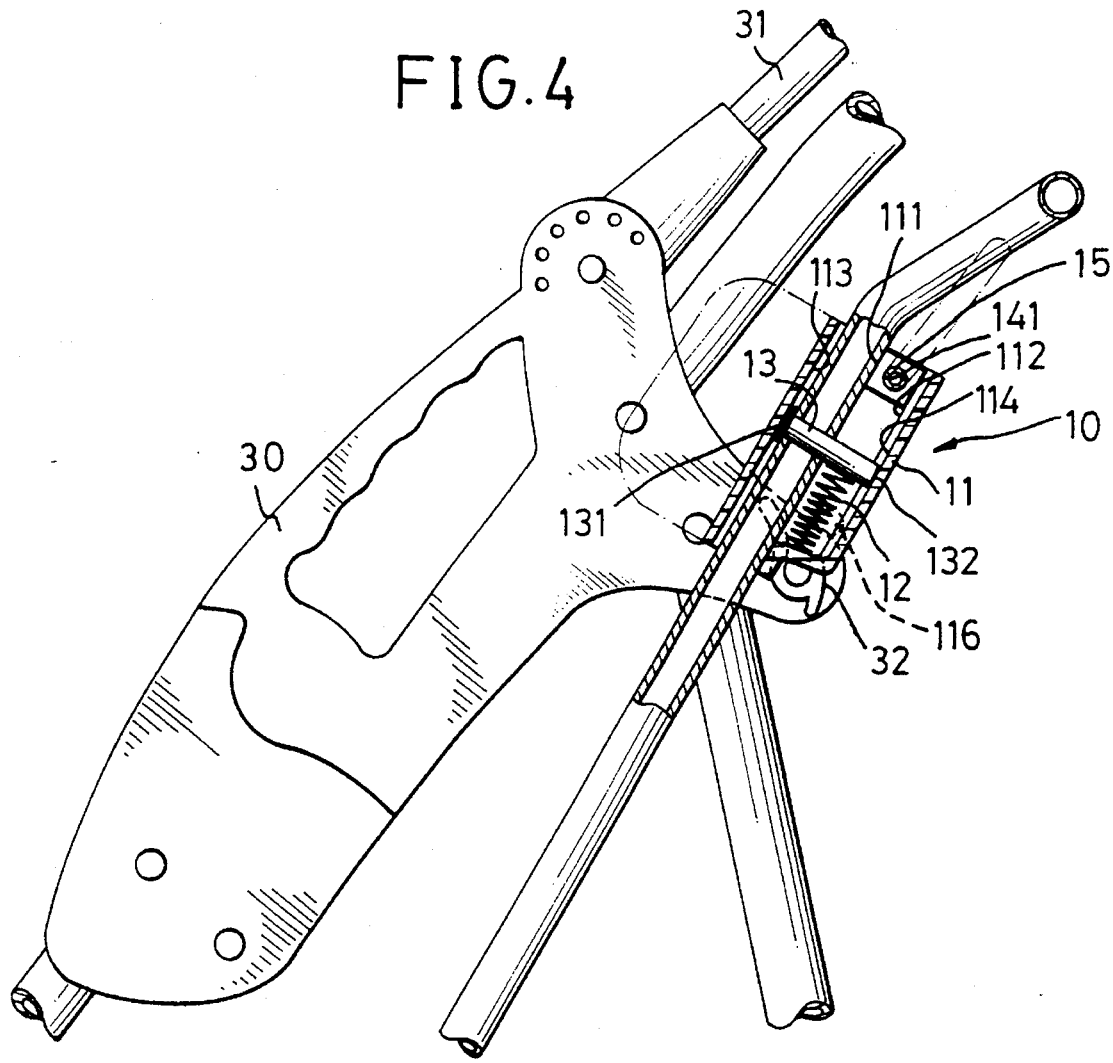
FIG. 4 is a view similar to FIG. 3, illustrating operation of the backrest adjusting/positioning device.

Furthermore, a socket 32 is provided to each foldable seat 30, such that when the backrest frame member 20 is in an almost upright position shown in FIG. 3, the two pins 116 are securely retained in the sockets 32 under the expansion force exerted by the return spring 12. When changing the backrest frame member 20 to a substantially horizontal position, the operator may simply use one hand to pull the pull bar 15 upward to urge the two slidable seats 11 to move upward (the return springs 12 are compressed, see FIG. 4) such that the pins 116 disengage with the sockets 32. Then, the backrest frame member 20 is moved rearward to a horizontal position shown by phantom lines in FIG. 1. If the pull bar 15 is released, the slidable seats 11 move back to their original positions under the action of the return springs 12.

Accordingly, it is appreciated that the drawbacks encountered by the prior art backrest adjusting device are mitigated and/or obviated under the provision of the invention.

Although the invention has been explained in relation to its preferred embodiment, it is to be understood that many other possible modifications and variations can be made without departing from the spirit and scope of the invention as hereinafter claimed.

I claim:

1. A backrest adjusting device for a stroller having a frame and a backrest frame member with two limbs, comprising:
    a pair of sockets defined in the frame of the stroller;
    a slidable seat slidably mounted to each of said limbs and comprising:
        a receptacle;
        a spring mounted in said receptacle;
        a first pin mounted above said spring and transversely passing through associated said limb of said backrest frame member;
        a stop piece mounted in said receptacle and located above said first pin thereby defining a lowermost position of said slidable seat; and
        a second pin projecting outward from an outer periphery thereof; and
    a pull bar mounted between said slidable seats;
    whereby said second pins engage with said sockets when said backrest frame member is in a substantially upright position, and said backrest frame member is pivotable to a substantially horizontal position when said second pins disengage with said sockets upon actuation of said pull bar which causes upward movements of said slidable seats.

2. The device as claimed in claim 1 wherein each said slidable seat comprises:
    a first section having a longitudinal bore defined therein through which associated said limb of said backrest frame member passes;
    a second section having a receptacle therein which communicates with said longitudinal bore and in which said spring and said stop piece are received;
    a pin head receiving compartment defined in said first section opposite to said second section; and
    a recess defined in said second section opposite to said pin head receiving compartment; and
    said first pin includes a pin head received in said pin head receiving compartment and a stem with a distal end received in said recess.

3. A stroller comprising:
    a frame having a pair of sockets defined therein;
    a backrest frame member having two limbs; and
    a backrest adjusting device comprising:
        a slidable seat slidably mounted to each said limb and comprising a receptacle, a spring mounted in said receptacle, a first pin mounted above said spring and transversely passing through said limb of said backrest frame member, a stop piece mounted in said receptacle and located above said first pin thereby defining a lowermost position of said slidable seat, and a second pin projecting outward from an outer periphery thereof; and
        a pull bar mounted between said slidable seats;
        whereby said second pins engage with said sockets when said backrest frame member is in a substantially upright position, and said backrest frame member is pivotable to a substantially horizontal position when said second pins disengage with said sockets upon actuation of said pull bar which causes upward movements of said slidable seats.

4. The stroller as claimed in claim 3 wherein each said slidable seat comprises:
    a first section having a longitudinal bore defined therein through which associated said limb of said backrest frame member passes;
    a second section having a receptacle therein which communicates with said longitudinal bore and in which said spring and said stop piece are received;
    a pin head receiving compartment defined in said first section opposite to said second section; and
    a recess defined in said second section opposite to said pin head receiving compartment; and
    said first pin includes a pin head received in said pin head receiving compartment and a stem with a distal end received in said recess.

* * * * *